United States Patent
Homma et al.

(10) Patent No.: US 8,274,180 B2
(45) Date of Patent: Sep. 25, 2012

(54) TRAIN CONFIGURATION RECOGNITION SYSTEM AND TRAIN CONFIGURATION RECOGNITION APPARATUS

(75) Inventors: Hidetoshi Homma, Hyogo (JP); Masayuki Takeyama, Tokyo (JP); Ryuya Mo, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 281 days.

(21) Appl. No.: 12/738,953

(22) PCT Filed: Jun. 13, 2008

(86) PCT No.: PCT/JP2008/060879
§ 371 (c)(1), (2), (4) Date: Apr. 20, 2010

(87) PCT Pub. No.: WO2009/069328
PCT Pub. Date: Jun. 4, 2009

(65) Prior Publication Data
US 2010/0219682 A1    Sep. 2, 2010

(30) Foreign Application Priority Data
Nov. 30, 2007  (JP) .................................. 2007-311449

(51) Int. Cl.
*H01H 31/10*  (2006.01)
(52) U.S. Cl. ...................................................... 307/115
(58) Field of Classification Search ................... 307/115
See application file for complete search history.

(56) References Cited

U.S. PATENT DOCUMENTS

| | | | |
|---|---|---|---|
| 4,825,189 | A | 4/1989 | Homma et al. |
| 6,114,974 | A | 9/2000 | Halvorson |
| 2006/0180709 | A1 | 8/2006 | Breton et al. |
| 2008/0295138 | A1 | 11/2008 | Emoto et al. |

FOREIGN PATENT DOCUMENTS

| | | |
|---|---|---|
| EP | 1 031 488 | 8/2000 |
| EP | 1 065 128 | 1/2001 |
| EP | 1 138 570 A2 | 10/2001 |
| FR | 2 121 297 | 8/1972 |

(Continued)

OTHER PUBLICATIONS

Notice of Allowance from Korean Patent Office issued in corresponding Korean Patent Application No. 10-2010-7010358 dated Dec. 5, 2011.

(Continued)

*Primary Examiner* — Robert L. Deberadinis
(74) *Attorney, Agent, or Firm* — Buchanan Ingersoll & Rooney PC

(57) ABSTRACT

A pair of transmission lines 17a, 17b are provided in the train in such a manner that, at each of the two ends of each of the carriage groups, one of the train end detection switches 41 is connected to one of the pair of transmission lines. A resistor 34 is inserted in at least one of the pair of transmission lines, and a voltage detector measures a voltage V1, V2 between the pair of transmission lines at each of both ends of the resistor. A controlling unit controls a first and a second switches 33a, 33b in such a manner that there is only one location within the train where a power supply 31, 32 is inserted between the pair of transmission lines, and the controlling unit recognizes the configuration of the train based on the voltages that have been measured by the voltage detectors.

16 Claims, 14 Drawing Sheets

FOREIGN PATENT DOCUMENTS

| | | |
|---|---|---|
| FR | 2 591 981 | 6/1987 |
| JP | 1-091601 A | 4/1989 |
| JP | 3-015203 A | 1/1991 |
| JP | 6-078402 A | 3/1994 |
| JP | 8-098303 A | 4/1996 |
| JP | 2000-302039 A | 10/2000 |
| JP | 2001-088704 A | 4/2001 |
| JP | 2001-233202 A | 8/2001 |
| JP | 2005-117373 A | 4/2005 |
| JP | 2006-148871 A | 6/2006 |
| JP | 2006-232203 A | 9/2006 |
| KR | 10-1998-087156 A | 12/1998 |
| KR | 10-0860789 B1 | 9/2008 |
| TW | I308120 B | 4/2009 |

OTHER PUBLICATIONS

International Search Report dated Sep. 22, 2008.
Non-English version of the Written Opinion of the International Searching Authority dated Sep. 22, 2008.
Supplementary European Search Report dated May 24, 2011, issued in the corresponding European Patent Application No. 08765589.0-2215.
Office Action (Decision on Grant) dated Sep. 21, 2011, issued in the corresponding Russian Patent Application No. 2010126651, and an English Translation thereof.
Office Action from Taiwanese Patent Office dated May 22, 2012, issued in corresponding Taiwanese Patent Application No. 097130492, with English translation thereof.

FIG.4

| Married pair | Car type | V1 (V) | V2 (V) | The position of cars in a train (from the end car) |
|---|---|---|---|---|
| #7 | B | 0.0 | 1.25 | 1 |
| #7 | A | 2.5 | 1.25 | 2 |
| #6 | A | 2.5 | 3.75 | 3 |
| #6 | B | 5.0 | 3.75 | 4 |
| #5 | A | 5.0 | 6.25 | 5 |
| #5 | B | 7.5 | 6.25 | 6 |
| #4 | B | 7.5 | 8.75 | 7 |
| #4 | A | 10.0 | 8.75 | 8 |
| #3 | B | 10.0 | 11.25 | 9 |
| #3 | A | 12.5 | 11.25 | 10 |
| #2 | B | 12.5 | 13.75 | 11 |
| #2 | A | 15.0 | 13.75 | 12 |
| #1 | B | 15.0 | 16.25 | 13 |
| #1 | A | 17.5 | 16.25 | 14 |

GROUP A

TRAIN CONFIGURATION RECOGNITION SYSTEM AND TRAIN CONFIGURATION RECOGNITION APPARATUS

TECHNICAL FIELD

The present invention relates to a train configuration recognition system and a train configuration recognition apparatus that have a function of automatically recognizing a configuration of a train in which a plurality of railway carriages are joined together.

BACKGROUND ART

A communication apparatus for railway carriages that has conventionally been known includes: a configuration controlling unit having an interface that uses a carrier sense multiple access method; a switching hub that branches a transmission path; and a switch that disconnects input/output signals to and from the switching hub. The communication apparatus makes it possible to recognize a configuration of a train by controlling communications in upstream and downstream directions of the transmission path by connecting and disconnecting the switch (e.g., Patent Document 1 listed below).

In the communication apparatus for railway carriages described in Patent Document 1, failures are avoided by using the switching hub that configures communication apparatuses so as to have one-to-one communications. In addition, no master communication apparatus is provided so that it is possible to prevent communication halts within the carriages and to improve the reliability of the system.

Patent Document 1: Japanese Patent Application Laid-Open No. 2005-117373

DISCLOSURE OF INVENTION

Problem to be Solved by the Invention

The communication apparatus for railway carriages described in Patent Document 1 uses a method by which the connection relationships among the carriages are detected by utilizing a transmission function between the communication apparatuses so that it is possible to recognize the configuration of the train. Thus, a problem arises where, in the case where a failure has occurred in a communication apparatus, the transmission path bypasses the carriage in which the communication apparatus having the failure is installed, and the presence of the carriage therefore becomes obscure.

To cope with this problem, it is conceivable to utilize regularities in carriage configurations or in the numbers assigned to the carriages; however, railway carriages used in, for example, Europe and North America are not necessarily configured in such a manner that the carriage configurations and the numbers assigned to the carriages have regularities. Thus, it is not possible to use this idea to solve the problem.

In view of the circumstances described above, it is an object of the present invention to provide a train configuration recognition system and a train configuration recognition apparatus that make it possible to automatically recognize a configuration of a train, including carriages that are not capable of having communications related to regularities in the carriage configurations and the numbers assigned to the carriages.

Means for Solving Problem

To solve the above described problem and to achieve the above described object, the train configuration recognition system according to the present invention is a train configuration recognition system for recognizing a configuration of a train configured with a plurality of carriages that are joined together while carriage groups each made up of a single carriage or two or more carriages are used as units, the train configuration recognition system comprising: train end detection switches that are respectively provided at two ends of each of the carriage groups and each of which is configured so that a contact point thereof is open if another one of the carriage groups is joined to a corresponding one of the two ends and so that the contact point thereof is closed if none of other carriage groups is joined to the corresponding one of the two ends; a pair of transmission lines that are provided in the train in such a manner that, at each of the two ends of each of the carriage groups, one end of a corresponding one of the train end detection switches is connected to one of the pair of transmission lines, whereas other end of the corresponding one of the train end detection switches is connected to other of the pair of transmission lines; and train configuration recognition apparatuses each of which is provided in a different one of the carriages and that recognize the configuration of the train, wherein one of the train configuration recognition apparatuses controls others of the train configuration recognition apparatuses within the train, and each of the train configuration recognition apparatuses includes: a power supply that outputs a direct current; first and second switches that are respectively inserted in the pair of transmission lines and that are configured so as to switch between (a) a state in which the power supply is inserted between the pair of transmission lines, and also, the pair of transmission lines are segmented and (b) another state in which the power supply is not inserted; a resistor that is inserted in at least one of the pair of transmission lines; a voltage detector that measures a voltage between the pair of transmission lines at each of both ends of the resistor; and a controlling unit to which the voltages having been measured by the voltage detector are input and that recognizes the configuration of the train and controls the first and the second switches in such a manner that there is only one location within the train where the power supply is inserted between the pair of transmission lines.

Effect of the Invention

The train configuration recognition system according to an aspect of the present invention includes train end detection switches that are used for detecting ends (i.e., the front and the rear ends) of a train and each of which is configured so that a contact point thereof is closed if carriages are not joined together. At each of two ends of each of carriage groups, one end and the other end of the corresponding one of the train end detection switches are respectively connected to one and the other of a pair of transmission lines that are provided in the train. First and second switches that are respectively inserted in the pair transmission lines are configured so as to switch between (a) a state in which a power supply is inserted between the transmission lines, and also, the pair of transmission lines are segmented and (b) another state in which the power supply is not inserted. While control is being exercised so that there is only one location within the train where the power supply is inserted between the pair of transmission lines, a voltage between the one-end side of a resistor and a reference end and a voltage between the other-end side of the resistor and the reference end are measured, the resistor being inserted in at least one of the pair of transmission lines, so that it is possible to recognize the configuration of the train based on the measured voltages. Consequently, an advantageous effect is achieved where it is possible to automatically recognize the configuration of the train, including carriages that are not capable of having communications related to regularities in the carriage configurations and the numbers assigned to the carriages.

BRIEF DESCRIPTION OF DRAWINGS

FIG. 4 is a table of examples of measured voltages and recognition results from the train configuration illustrated in FIG. 3.

FIG. 7-1 is a diagram for explaining a measuring operation that is performed in the case where a conduction failure has occurred in an automatic coupler (steps 21 to 23).

FIG. 7-2 is another diagram for explaining the measuring operation that is performed in the case where a conduction failure has occurred in an automatic coupler (steps 24 and 25).

FIG. 7-3 is still another diagram for explaining the measuring operation that is performed in the case where a conduction failure has occurred in an automatic coupler (steps 26 and 27).

EXPLANATIONS OF LETTERS OR NUMERALS

Figure 1:
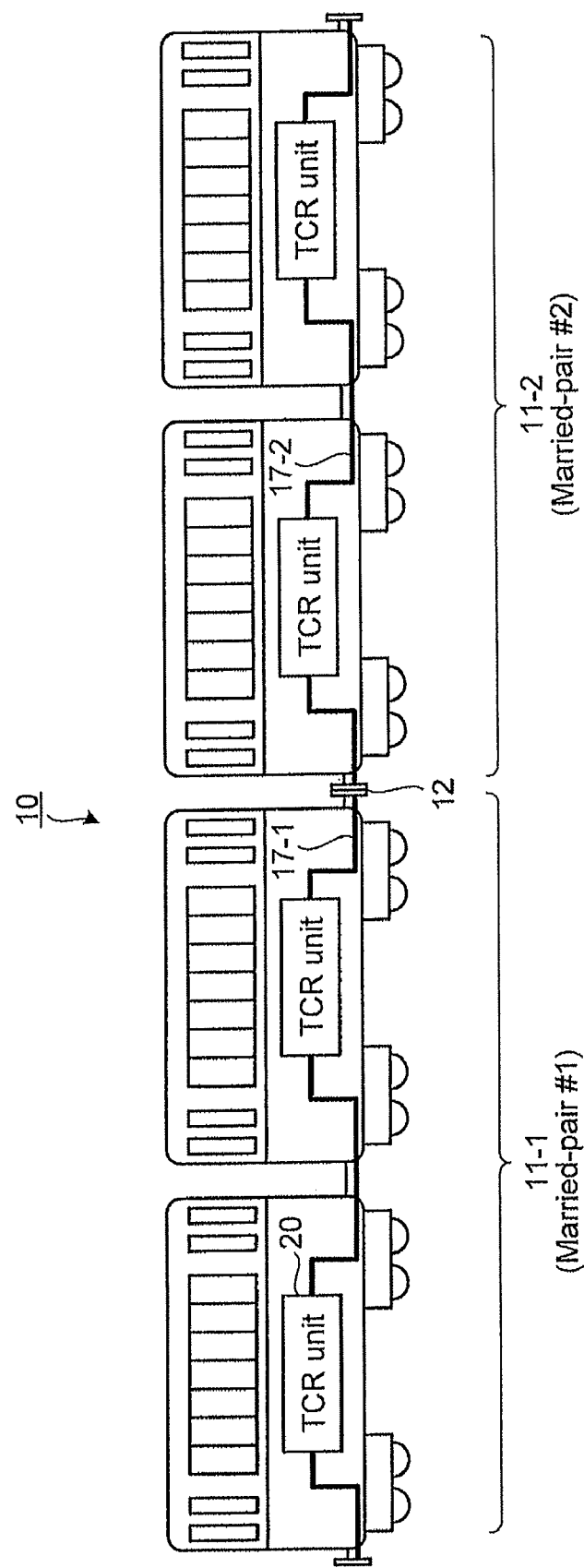
FIG. 1 is a drawing of a schematic structure of a train configuration recognition system according to an embodiment of the present invention.

10: train
11: carriage groups
12: automatic coupler
17, 17a, 17b: transmission line
20: train configuration recognition apparatus
21: TCR circuit
22: controlling unit
31: direct-current voltage source
32: current source
33, 33a, 33b: switch
34, 34a, 34b: resistor
35: voltage detector
41: train end detection switch

BEST MODE(S) FOR CARRYING OUT THE INVENTION

In the following sections, exemplary embodiments of a train configuration recognition system and a train configuration recognition apparatus according to the present invention will be explained in detail, with reference to the accompanying drawings. The present invention is not limited to these exemplary embodiments.

<An Overview of a Train Configuration Recognition System>

First, an overview of a train configuration recognition system in which train configuration recognition apparatuses are installed will be explained. FIG. 1 is a drawing of a schematic structure of a train configuration recognition system according to an embodiment of the present invention. In the example illustrated in FIG. 1, a train 10 includes a carriage group 11-1 (i.e., married pair #1) and another carriage group 11-2 (i.e., married pair #2) in each of which carriages are joined together while two carriages are used as a unit and that are connected to each other via an automatic coupler 12 that is configured so as to attach and detach the carriage group 11-1 and the group 11-2 easily. A train configuration recognition apparatus (i.e., a Train Configuration Recognition (TCR) unit) 20 is installed in each of the carriages of the train 10. The train configuration recognition apparatuses 20 installed in each of the carriages are connected to one another via transmission lines 17 (transmission lines 17-1 and 17-2). The transmission lines 17 are provided within the carriage groups as conductive members that form electrical circuits. Also, the transmission lines 17 are connected to one another via the automatic coupler 12 joining the carriage groups together. In other words, within the train, the transmission line 17-1 provided in the carriage group 11-1 is electrically connected to the transmission line 17-2 provided in the carriage group 11-2, by making use of electrical contact points of the automatic coupler 12, which is a conductive member. In the drawings (including FIG. 1) that are referred to in the explanation hereinafter, a configuration of a train configured with a plurality of carriage groups that are joined together while each of the plurality of carriage groups includes two carriages as a unit is used as an example; however, the train configuration may be a configuration of a train configured with a plurality of single carriages that are joined together. Needless to say, it is possible to apply the train configuration recognition apparatuses according to the present embodiment to such a train configuration.

<A Structure of the Train Configuration Recognition Apparatuses>

Figure 2:
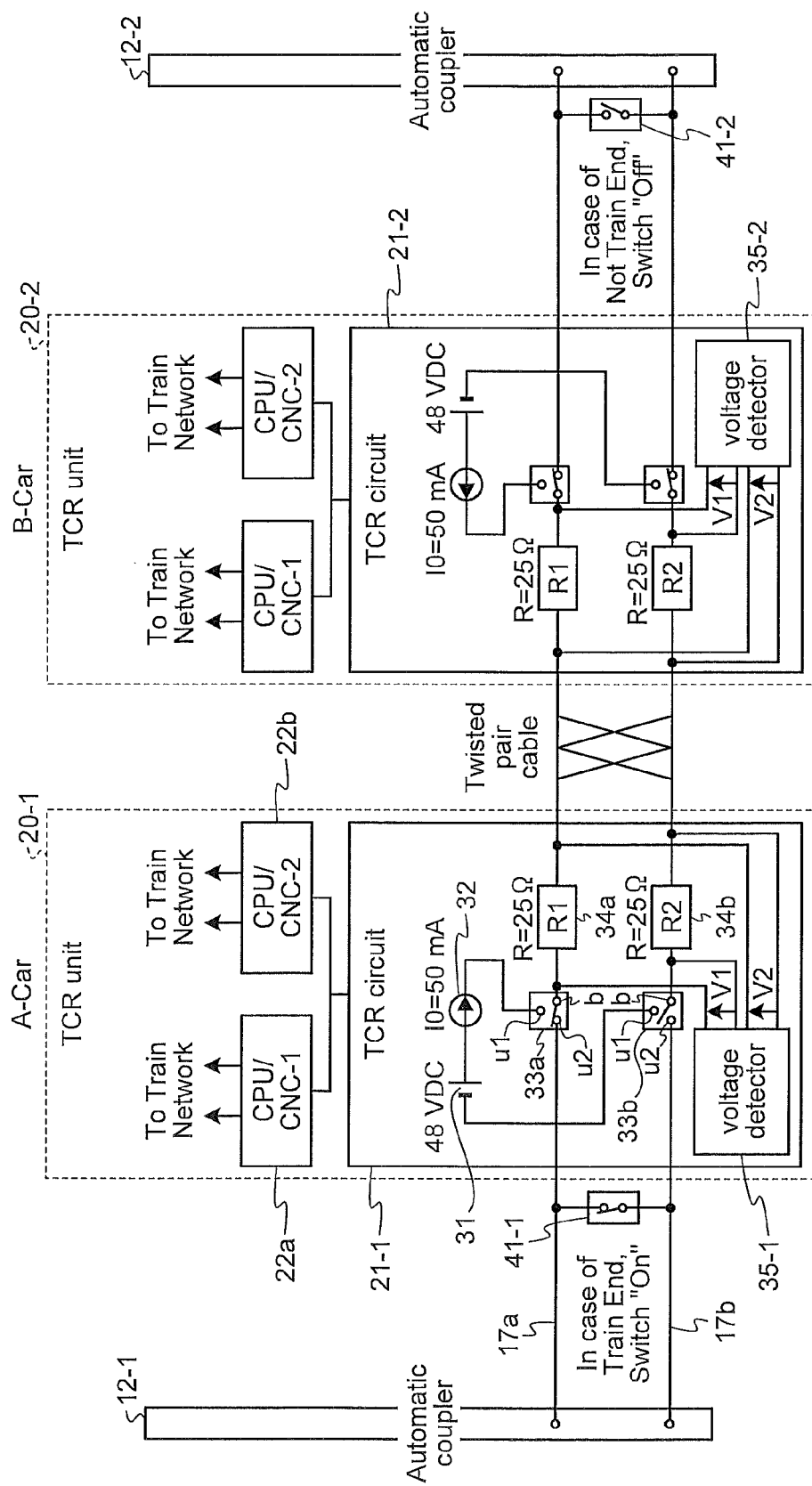
FIG. 2 is a diagram for illustrating a structure and a connection mode of train configuration recognition apparatuses according to the embodiment.

Next, a structure and a connection mode of the train configuration recognition apparatuses will be explained. FIG. 2 is a diagram for illustrating a structure and a connection mode of the train configuration recognition apparatuses according to the embodiment. In FIG. 2, a structure that corresponds to one of the carriage groups illustrated in FIG. 1 is illustrated. In FIG. 2, each of the train configuration recognition apparatuses 20 (20-1 and 20-2) is configured so as to include a train configuration recognition circuit (i.e., a TCR circuit in the drawing; also, a "TCR circuit" hereinafter) 21 (21-1 or 21-2) that serves as a main circuit of the apparatus and controlling units 22 (22a and 22b) that control an operation of the TCR circuit 21. Provided in each of the TCR circuits 21 are circuit elements such as a direct-current voltage source 31, a current source 32, switches 33 (33a and 33b), and resistors 34 (34a and 34*b*) as well as a functional unit such as a voltage detector 35. These circuit elements and functional unit are provided in key locations of two transmission lines 17*a* and 17*b* that each link together an automatic coupler 12-1 illustrated on the left-hand side of FIG. 2 and another automatic coupler 12-2 illustrated on the right-hand side of FIG. 2.

Between each of the automatic couplers 12 (12-1 and 12-2) and a corresponding one of the TCR circuits 21 (21-1 and 21-2), a train end detection switch 41 (41-1 or 41-2) is provided while being connected between the transmission line 17*a* and the transmission line 17*b*. The train end detection switches 41 are switches used for detecting front and rear ends (hereinafter, the "ends") of the train configuration. Each of the train end detection switches 41 is configured so that the contact point thereof is in a closed state while being positioned at an end of the train configuration and so that the contact point thereof is in an open state in other situations. In the example illustrated in FIG. 2, of the two carriages (an A-car and a B-car) included in the carriage group, the train end detection switch 41-1 provided on the A-car side is on, whereas the train end detection switch 41-2 provided on the B-car side is off. In other words, the A-car side is positioned at an end of the train configuration.

It is desirable to configure each of the train end detection switches 41 so as to be a mechanical switch that operates in conjunction with the corresponding one of the automatic couplers 12. In terms of the function thereof, it is desirable to configure each of the train end detection switches 41 so that the contact point thereof is in an open state while two automatic couplers are connected to each other and so that, conversely, the contact point thereof is in a closed state while the corresponding one of the automatic couplers is not connected to another automatic coupler. By configuring each of the train end detection switches 41 so as to be a mechanical switch as described above, it is possible to detect the ends of the train configuration without fail.

In the example illustrated in FIG. 2, the TCR circuit 21-1 provided in the A-car and the TCR circuit 21-2 provided in the B-car are connected to each other by using a twisted pair of cables, which has excellent resistance to noises. In this connection, a twisted pair connection may be realized by twisting such portions of the transmission lines 17*a* and 17*b* that are positioned between the A-car and the B-car, the transmission lines 17*a* and 17*b* being provided between the automatic coupler 12-1 and the automatic coupler 12-2. Alternatively, another arrangement is acceptable in which the transmission lines 17*a* and 17*b* themselves are configured with a twisted pair of cables. Further, still another arrangement is also acceptable in which a portion of the A-car and a portion of the B-car are connected to each other by using a twisted pair cable that is configured with media that are physically different from each other.

The controlling units 22 (22*a* and 22*b*) control the operation of the corresponding one of the TCR circuits 21. Also, the controlling units 22 transmit information that has been processed by the corresponding one of the TCR circuits 21 so that the information is displayed on a display device or the like (not illustrated). With regard to this information transmission, it is possible to transmit the information by using a train communication network (Train Network (not illustrated)) that is different from the transmission lines 17*a* and 17*b*.

<A Structure of the TCR Circuits>

Next, a structure of the TCR circuits will be explained. In the TCR circuits 21 illustrated in FIG. 2, the switch 33*a* and the resistor 34*a* are inserted in series in the transmission line 17*a* in the stated order, as seen from the automatic coupler 12-1 side. Similarly, the switch 33*b* and the resistor 34*b* are inserted in series in the transmission line 17*b* in the stated order, as seen from the automatic coupler 12-1 side. Each of the switches 33*a* and 33*b* is a one-circuit two-contact switch that has switch contact points u1 and u2 and that is controlled by the controlling units 22 or a superordinate controlling device. The switch contact point u1 of the switch 33*a* is connected to a terminal on the positive electrode side (i.e., the side from which the electric current flows out) of the current source 32, whereas the switch contact point u2 of the switch 33*a* is connected to the transmission line 17*a* on the automatic coupler 12-1 side. Further, the switch contact point u1 of the switch 33*b* is connected to a terminal on the negative electrode side of the direct-current voltage source 31, whereas the switch contact point u2 of the switch 33*b* is connected to the transmission line 17*b* on the automatic coupler 12-1 side. One end of the resistor 34*a* is connected to a base point b of the switch 33*a*, whereas the other end of the resistor 34*a* is connected to the transmission line 17*a* that is positioned on the opposite side of the automatic coupler 12-1. Further, one end of the resistor 34*b* is connected to a base point b of the switch 33*b*, whereas the other end is connected to the transmission line 17*b* that is positioned on the opposite side of the automatic coupler 12-1.

Figure 3:
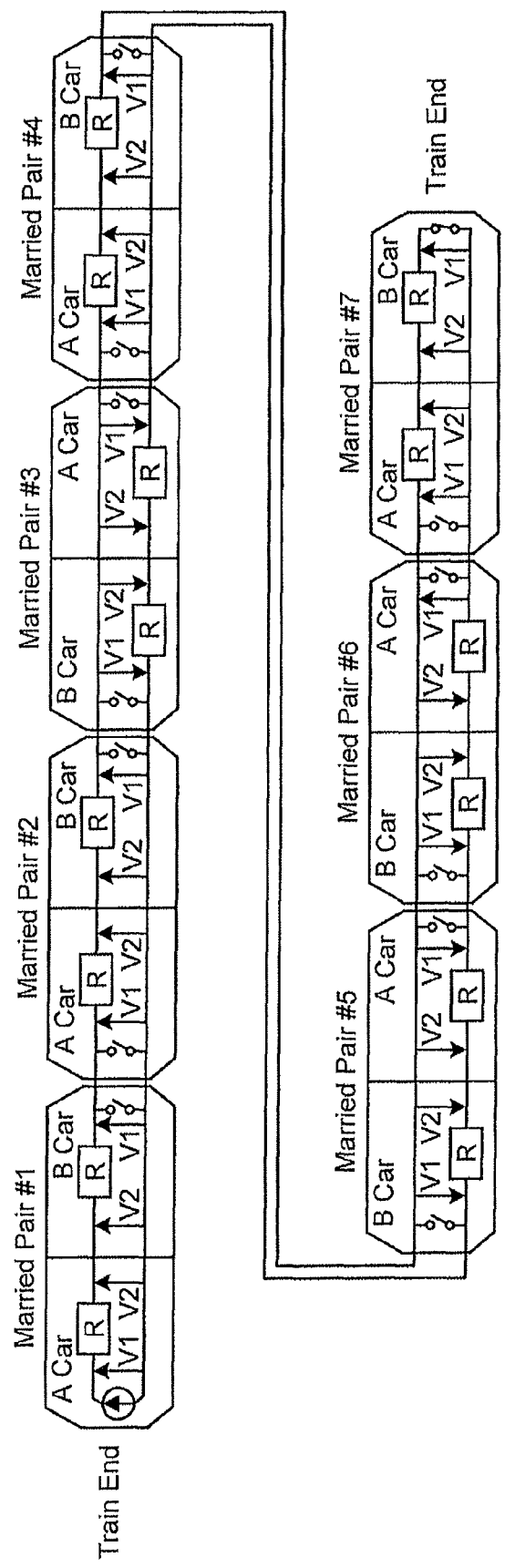
FIG. 3 is a diagram of an example of a train configuration used for explaining a principle of a configuration recognition process.

With the connections described above, it is possible to structure, within the train, a plurality of loop circuits by using the train end detection switches, the switches and the resistors included in the TCR circuits provided in the carriages, and the transmission lines that connect these circuit elements together. Usually, one loop that includes all the carriages is structured, as illustrated in FIG. 3.

In the structure illustrated in FIG. 2, an example is illustrated in which the direct-current voltage source 31 and the current source 32 are configured so that the positive electrode side of the direct-current voltage source 31 is connected to the negative electrode side (i.e., the side from which the electric current flows in) of the current source 32; however, the order may be reversed. In other words, an arrangement is acceptable in which the positive electrode side of the current source 32 is connected to the negative electrode side of the direct-current voltage source 31, while the positive electrode side of the direct-current voltage source 31 is connected to the switch contact point u1 of the switch 33*a*, whereas the negative electrode side of the current source 32 is connected to the switch contact point u1 of the switch 33*b*.

Each of the voltage detectors 35 (35-1 and 35-2) is connected between terminals for the purpose of measuring a voltage (i.e., a first measured voltage: V1) between one end of the resistor 34*a* and one end of the resistor 34*b* as well as a voltage (i.e., a second measured voltage: V2) between the other end of the resistor 34*a* and the other end of the resistor 34*b*. As illustrated in FIG. 2, the TCR circuit 21-1 provided in the A-car and the TCR circuit 21-2 provided in the B-car are configured so that the circuit structures thereof are line symmetric with respect to an axis that is orthogonal to a portion of the twisted pair cable. For this reason, the second measured voltage V2 measured by the voltage detector 35-1 included in the TCR circuit 21-1 is always equal to the second measured voltage V2 measured by the voltage detector 35-2 included in the TCR circuit 21-2, except for measurement errors. These measured voltages V1 and V2 are used as pieces of information with which it is possible to recognize the train configuration. The details of a principle thereof will be explained later.

<A Principle of a Configuration Recognition Process>

Next, a principle of a configuration recognition process by using the TCR circuits will be explained, with reference to FIGS. 2 and 3. FIG. 3 is a diagram of an example of a train configuration used for explaining the principle of the configuration recognition process. Unlike in the example illustrated in FIG. 2, only one of the resistors is inserted in the transmission line in each of the TCR circuits illustrated in FIG. 3; however, the principle is the same. For example, in the structure illustrated in FIG. 2, the resistance value of each of the resistors 34a and 34b is configured so as to be 25 ohms. It is possible to have an equivalent structure by, for example, configuring the resistance value in the structure illustrated in FIG. 3 so as to satisfy R=50 ohms.

Further, in the example illustrated in FIG. 3, a 14-carriage train is configured with seven carriage groups (i.e., married pairs #1 to #7) that are joined together. Each of the married pairs #1, #2, #4, and #7 is joined while the carriage group is oriented in a direction that is opposite from the direction in which the carriage group is oriented in each of the married pairs #3, #5, and #6. More specifically, for example, when the married pair #2 is compared with the married pair #3, the A-car and the B-car are positioned in the opposite order. In other words, the married pair #2 and the married pair #3 are joined together in such a manner that the respective B-cars therein are positioned next to each other. Conversely, the married pair #6 and the married pair #7 are joined together in such a manner that the respective A-cars therein are positioned next to each other. It should be noted, however, that the TCR circuits according to the present embodiment are capable of recognizing, without any problems, the manner in which the train is configured, even if the carriage groups are joined together as described above.

Next, the state of the train end detection switch and the manner in which the current source is connected in each of the carriages will be explained. As illustrated in FIG. 3, the train end detection switches provided in the A-car included in the married pair #1 and in the B-car included in the married pair #7 are closed, whereas all the other train end detection switches are open. It should be noted that the train end detection switch provided in the A-car included in the married pair #1 is not illustrated in the drawing because the A-car included in the married pair #1 is configured so as to be, for example, a steering carriage, and also because, in terms of the circuit structure, the direct-current voltage source 31 and the current source 32 are connected to the transmission lines by the switches 33a and 33b. For example, in FIG. 2, to connect the direct-current voltage source 31 and the current source 32 to the transmission lines 17a and 17b, it is necessary to exercise control so that each of the switches 33a and 33b is switched to the switch contact point u1 side. In this situation, by the switches 33a and 33b, the train end detection switch 41-1 is disconnected from such portions of the transmission lines 17a and 17b that are positioned on the right-hand side of the switches 33a and 33b. As a result, in each of the carriages in which the direct-current voltage source and the current source are connected between the transmission lines, the state of the train end detection switch does not have any effect on the operation of the circuit. As explained here, in each of the carriages while the train configuration recognition process is being performed, the train end detection switches provided in the carriages at both ends of the train are closed, whereas the train end detection switches provided in all the other carriages besides the carriages at both ends are open. Also, the control is exercised so that the direct-current voltage source and the current source provided in one of the carriages positioned at both ends of the train are connected between the transmission lines.

FIG. 4 is a table of examples of measured voltages and recognition results from the train configuration illustrated in FIG. 3. In FIG. 4, each of the values listed under the first measured voltage V1 and the second measured voltage V2 is an absolute value of the voltage that has been measured by the corresponding one of the voltage detectors. Each of the values that are placed in the boxes is the voltage value having the larger absolute value of the two measured voltages. In this situation, the direct-current voltage value V, the current value I0, and the resistance values R satisfy V=48 volts DC, I0=50 milliamperes, and R=25 ohms, respectively.

In FIG. 3, an electric current that satisfies I0=50 milliamperes is flowing in the circuit. Thus, it is possible to calculate a voltage drop corresponding to one resistor as I0×R=0.05 ampere×25 ohms=1.25 volts. Accordingly, for example, in the B-car included in the married pair #7, V1=0 volts and V2=1.25 volts are satisfied. After that, for every resistor being added, the voltage increases by an amount corresponding to the voltage drop. Accordingly, for example, in the A-car included in the married pair #7, V1=2.5 volts is satisfied. In this manner, the measured results as illustrated in FIG. 4 are obtained.

In addition, in FIG. 4, each of the values illustrated in the farthest right column of the table is obtained by dividing the value in the box by the value corresponding to the voltage drop. For example, for the A-car included in the married pair #5, it is possible to calculate the value as 6.25/1.25=5. As another example, for the B-car included in the married pair #2, it is possible to calculate the value as 13.75/1.25=11. It can be observed that these values represent serial numbers identifying the carriages starting from the B-car included in the married pair #7, which is positioned at the rear end of the train. To summarize, it is possible to recognize the train configuration by dividing the larger value of the two absolute values representing the first and the second measured voltages V1 and V2 that have been measured by each of the voltage detectors, by the predetermined value (i.e., the value that is determined according to the direct-current voltage source, the current source, and the resistance values in the circuit).

<An Operation in the Configuration Recognition Process>

Figure 5:
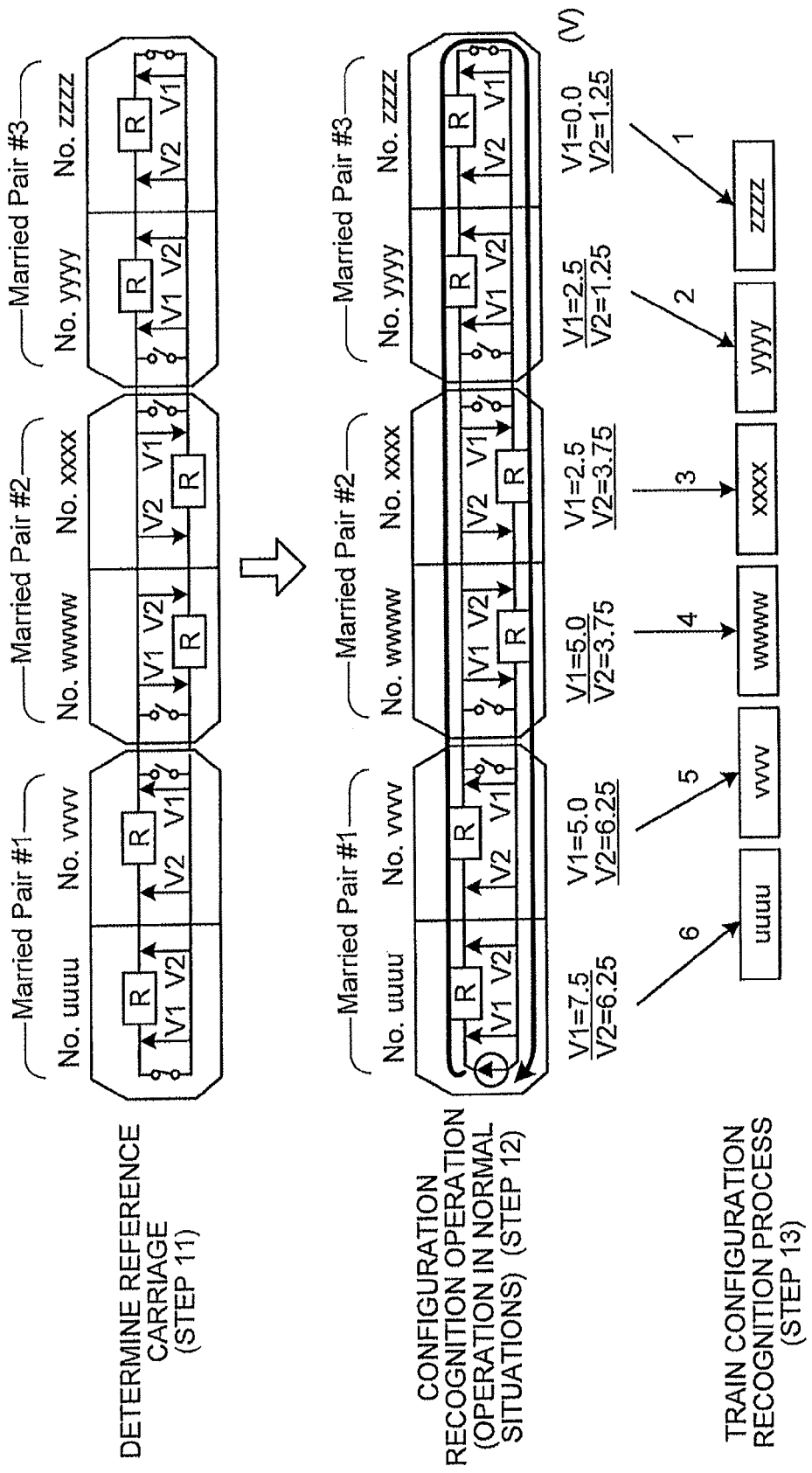
FIG. 5 is a diagram for explaining an operation in the configuration recognition process.

Next, an operation in the configuration recognition process will be explained, with reference to FIG. 5. FIG. 5 is a diagram for explaining an operation in the configuration recognition process. An example in which a train is configured with six carriages is illustrated in FIG. 5. In the explanation below, the direct-current voltage source 31 and the current source 32 will be collectively referred to as a "constant-current power supply".

First, a reference carriage in which the constant-current power supply is turned on (i.e., connected to the transmission lines) is determined. In this process, it is recognized that a carriage No. uuuu and a carriage No. zzzz are the carriages that are positioned at the ends of the train, based on the information showing the state of the train end detection switches each of which is configured so as to be closed if another carriage is not being joined and so as to be open if another carriage is being joined. One of the carriages positioned at the two ends of the train is determined as the reference carriage. It is acceptable to use any method for choosing one of the two carriages. For example, the one of the carriages having the smaller carriage number may be determined as the reference carriage (step 11).

Next, the constant-current power supply is turned on while using the carriage No. uuuu as the reference carriage, and also, the first measured voltage V1 and the second measured voltage V2 are measured in each of the carriages (step 12). By dividing the larger value of the first and the second measured voltages V1 and V2 that have been measured at step 12 by the predetermined value (i.e., the voltage drop per carriage), it is recognized, for each of the carriages, in what position the carriage is located as being counted from the end of the train (e.g., the first carriage from the end, the second carriage from the end, and so on.) (step 13).

<Operations that are Performed in the Case where a Failure has Occurred>

All the processes described above correspond to operations that are performed in normal situations. Further, in the case where a failure has occurred in the circuit or any of the switches or in the case where a wiring disconnection has occurred in the circuit, it is desirable to be able to back up the configuration recognition function even if the failure or the abnormality has occurred in one location (hereinafter, a "single failure"). The train configuration recognition system and the train configuration recognition apparatuses according to the present embodiment are configured so as to be fault-tolerant against such single failures. In the explanation below, the following five items are used as examples of events that can be anticipated as possible failures or abnormalities. Each of these items will be explained below.

(1) A conduction failure in any of the automatic couplers
(2) A conduction failure in any of the train end detection switches
(3) A failure in any of the constant-current power supplies
(4) A failure in any of the voltage detectors
(5) A wiring disconnection in any of the TCR circuits <An Operation that is Performed in the Case where a Failure has Occurred: a Conduction Failure in any of the Automatic Couplers>

Figure 6:
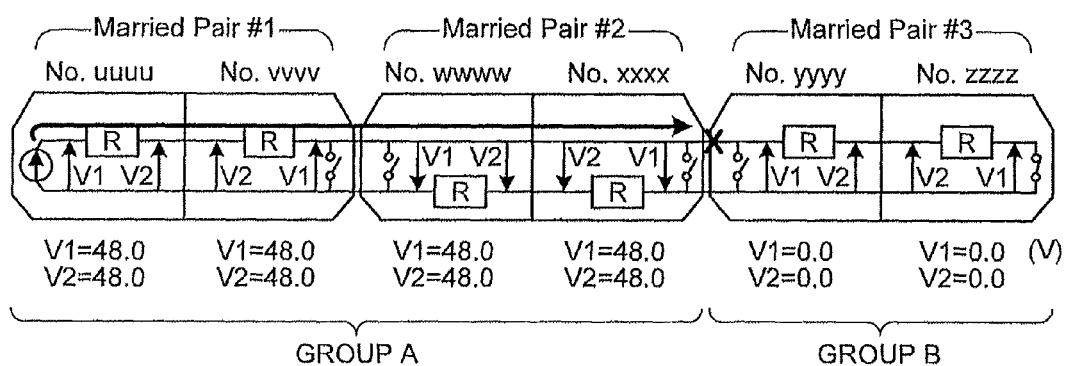
FIG. 6 is a diagram illustrating a state of a circuit in a situation where a conduction failure has occurred in an automatic coupler.

FIG. 6 is a diagram illustrating a state of a circuit in a situation where a conduction failure has occurred in an automatic coupler. In FIG. 6, a conduction failure in the automatic coupler provided between the married pair #2 and the married pair #3 is illustrated as an example. In this situation, because the carriage No. xxxx and the carriage No. yyyy are not electrically connected to each other and because all the switches between the constant-current power supply and the conduction failure location are open, no electric current is flowing in the transmission lines. As a result, it is recognized that the first measured voltages V1 and the second measured voltages V2 may be organized into a group indicating 48 volts (i.e., Group A) and another group indicating 0 volts (i.e., Group B). Accordingly, at this stage, it is possible to determine that some kind of failure has occurred in the boundary portion between Group A and Group B.

In this situation, for each of the groups of Group A and Group B, a processing procedure to detect the positions of the carriages within the group is taken, by sequentially changing the carriage in which the constant-current power supply is turned on. This process will be explained below with reference to FIGS. 7-1 to 7-3.

<A Position Recognition Process within Group A>

Figures 1, 7:
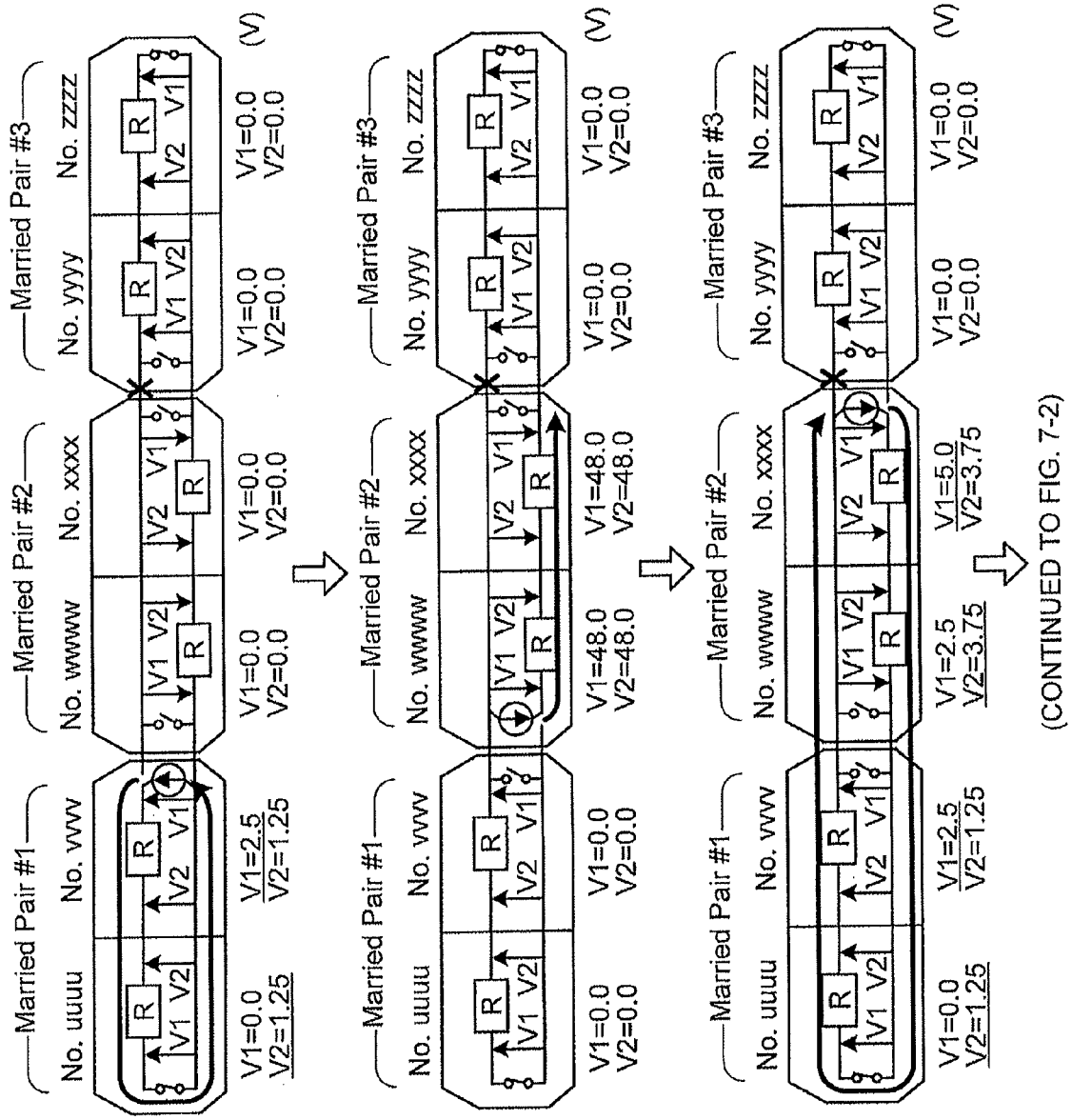
Figures 2, 7:
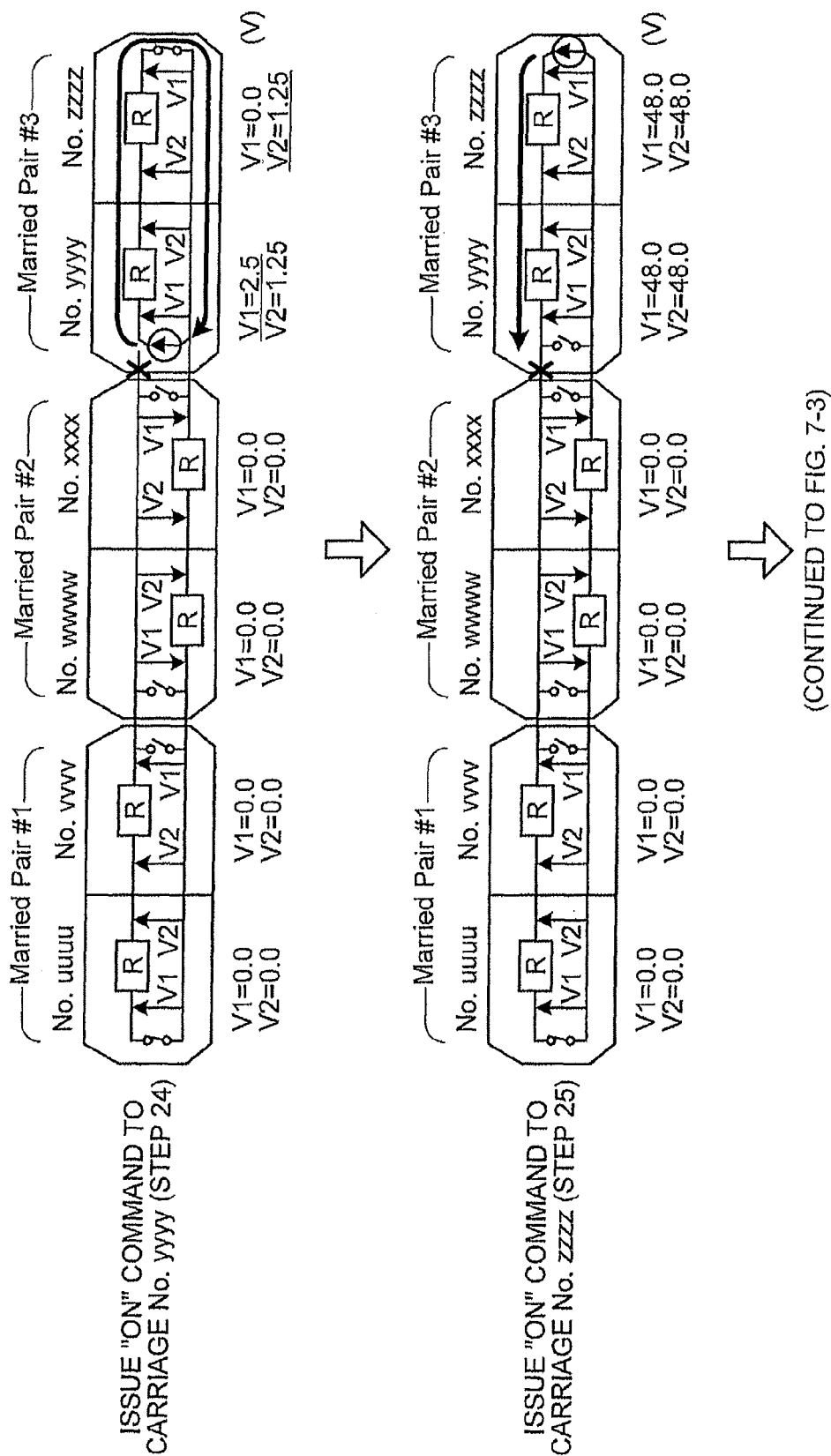
Figures 3, 7:
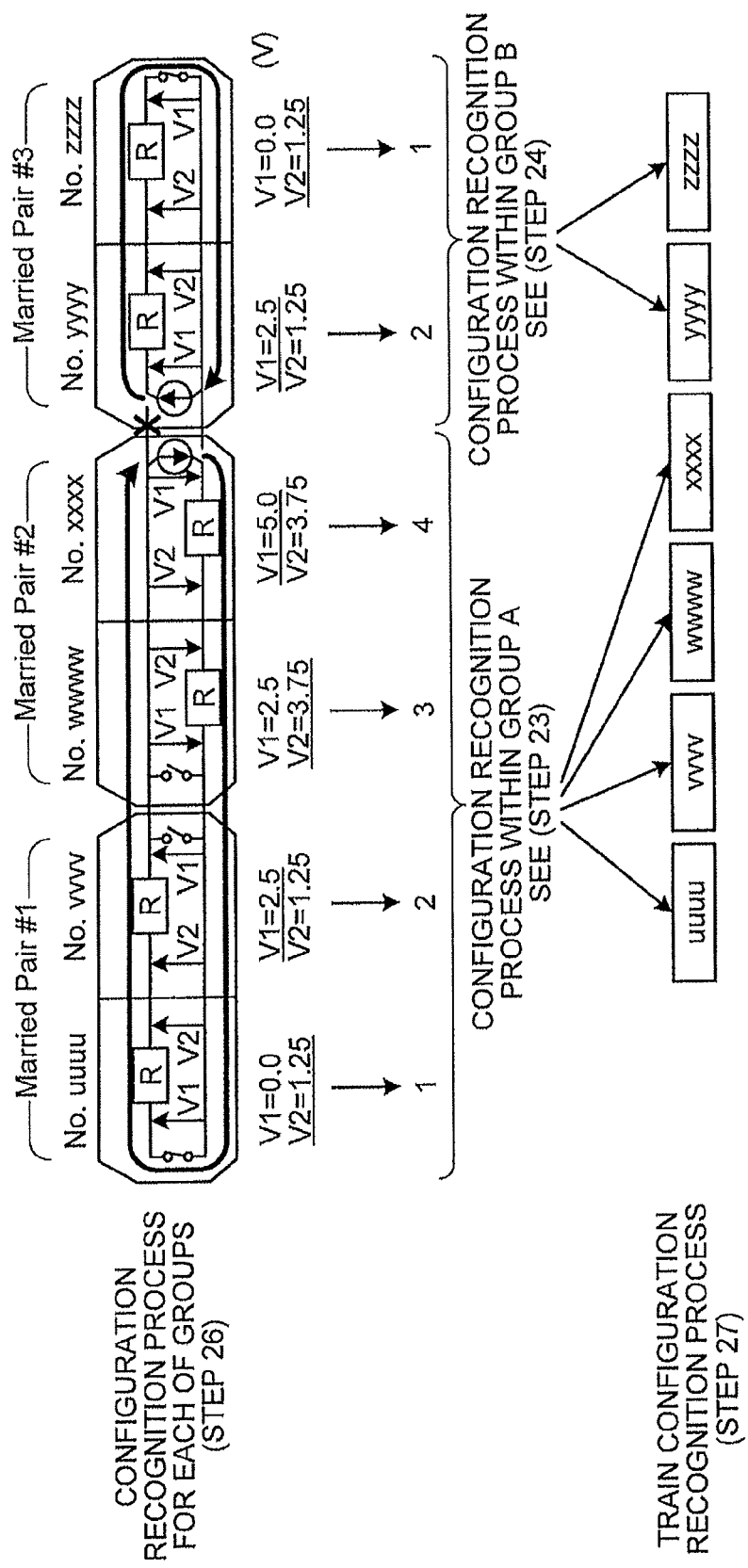

In FIG. 7-1, first, the constant-current power supply provided in the carriage No. vvvv that is positioned adjacent to the carriage No. uuuu is turned on, so that the measured voltages in that situation are recorded (step 21). In this situation, needless to say, the constant-current power supply provided in the carriage No. uuuu is not turned on. The same applies to the processes described below. In other words, only one constant-current power supply is turned on within each of the groups.

After that, the constant-current power supply provided in the carriage No. wwww and the constant-current power supply provided in the carriage No. xxxx are sequentially turned on (steps 22 and 23). In the present example, when the constant-current power supply provided in the carriage No. xxxx is turned on, the positions of the four carriages in Group A are recognized based on the measured voltages that are underlined in FIG. 7-1.

<A Position Recognition Process within Group B>

A similar process is performed also for Group B. Until the positions of all the carriages in Group B have been recognized, a command to turn on the constant-current power supply is issued sequentially to each of the carriages. In the present example, as illustrated in FIG. 7-2, the constant-current power supplies in the carriage No. yyyy and the carriage No. zzzz are sequentially turned on in the stated order, so that the measured voltages are recorded (steps 24 and 25). The positions of the two carriages in Group B are recognized based on the measured voltages that are underlined in FIG. 7-2. In the present example, the commands to turn on the constant-current power supplies are sequentially output, starting from the carriage No. yyyy that is positioned closest to the conduction failure location; however, another arrangement is acceptable in which the commands to turn on the constant-current power supplies are sequentially output, starting from the carriage No. zzzz that is positioned farthest from the conduction failure location.

<A Process to Recognize the Entire Configuration>

FIG. 7-3 is a drawing illustrating the results from FIGS. 7-1 and 7-2. At step 26, the configuration of the entirety is recognized. At step 27, the configuration of the train is recognized. At step 26, within each of the groups, serial numbers (i.e., 1, 2, and so on) are sequentially assigned to the carriages, starting from the carriage that is positioned on the opposite side of the position in which the constant-current power supply was turned on. Thus, by organizing the numbers based on the position of the constant-current power supply that is turned on at the time of the measurement, it is possible to recognize the configuration of the entirety.

<An Operation that is Performed in the Case where a Failure has Occurred: a Conduction Failure in any of the Train End Detection Switches>

Figure 8:
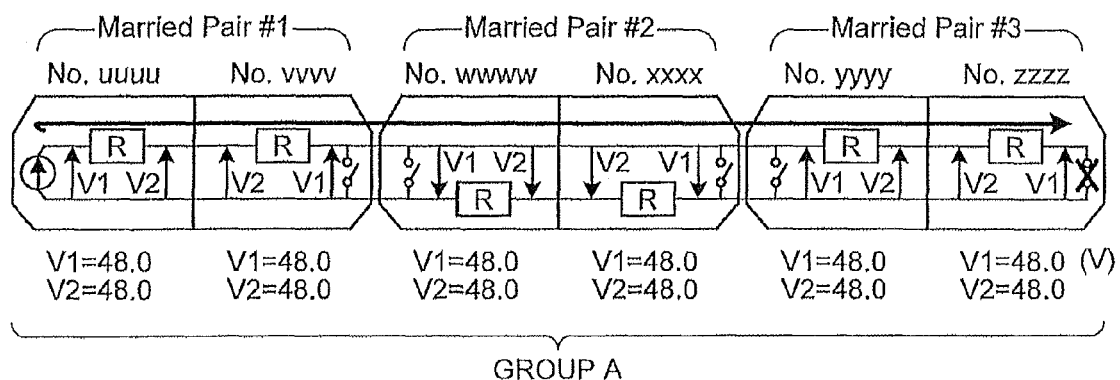
FIG. 8 is a diagram illustrating a state of a circuit in a situation where a conduction failure has occurred in a train end detection switch.

FIG. 8 is a diagram illustrating a state of a circuit in a situation where a conduction failure has occurred in a train end detection switch. In FIG. 8, a situation where a conduction failure has occurred in a train end detection switch provided in the married pair #3 is illustrated as an example. In this situation, because all the switches between the constant-current power supply and the train end detection switch having the conduction failure are open, no electric current is flowing in the transmission lines. As a result, all the measured voltages are 48 volts. This state is the same as the state in a situation where, with a conduction failure in an automatic coupler, all the measured voltages are organized into Group A so that there is no Group B. Thus, by using the same method as in the example with a conduction failure in an automatic coupler, it is possible to recognize the train configuration.

<An Operation that is Performed in the Case where a Failure has Occurred: a Failure in any of the Constant-Current Power Supplies>

Figure 9:
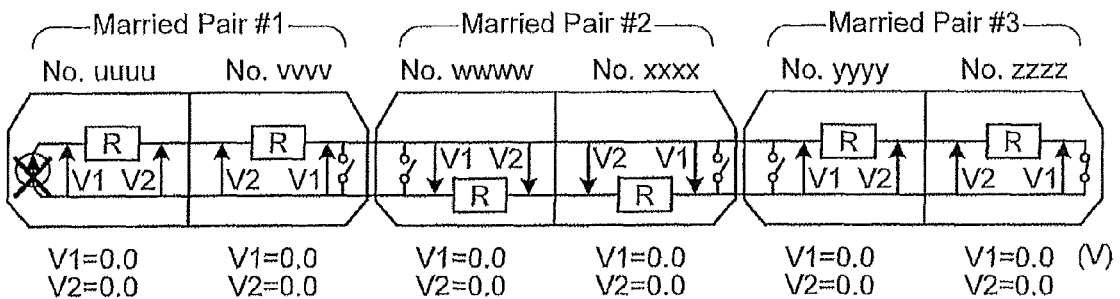
FIG. 9 is a diagram illustrating a state of a circuit in a situation where a failure has occurred in a constant-current power supply.
Figure 10:
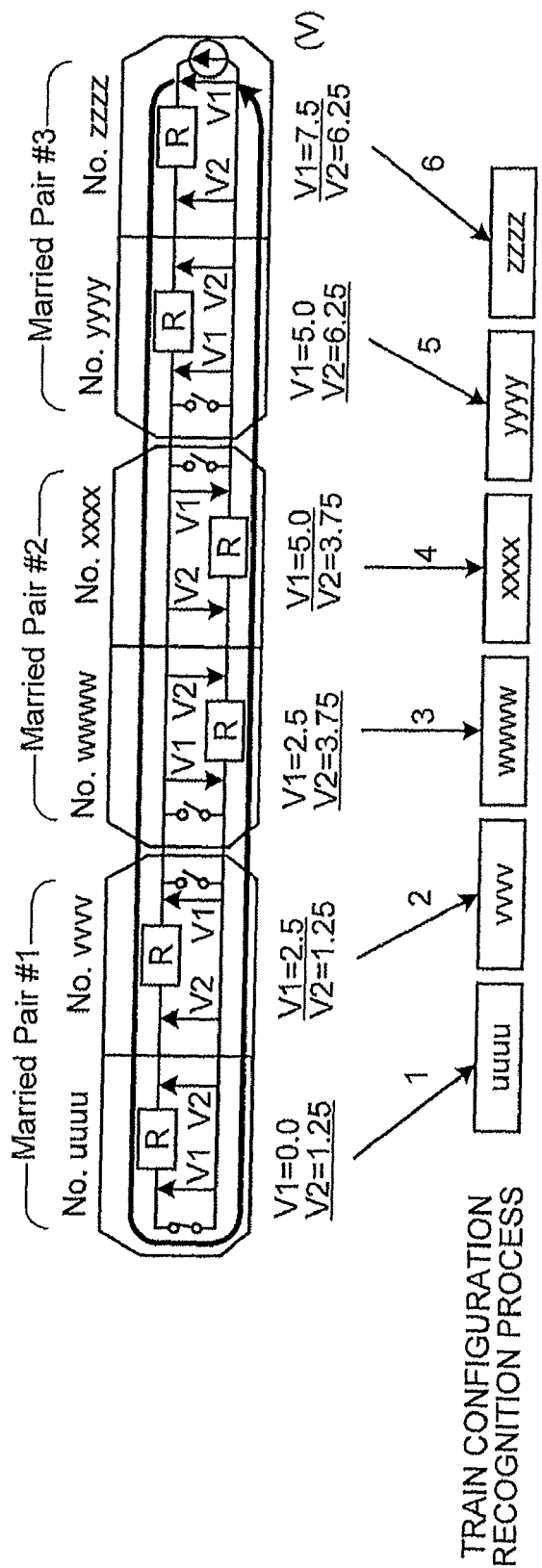
FIG. 10 is a diagram illustrating a state of a circuit in a situation where a constant-current power supply provided at the opposite end of the train is used as a substitution, in the state illustrated in FIG. 9.

FIG. 9 is a diagram illustrating a state of a circuit in a situation where a failure has occurred in a constant-current power supply. In FIG. 9, a situation where a failure has occurred in the constant-current power supply provided in the carriage No. uuuu, which is used as a reference in the configuration recognition process, is illustrated as an example. In this situation, the TCR circuit has no power supply so that no electric current flows in the transmission lines. Also, because no voltage is applied, all the measured voltages are 0 volts. Thus, as illustrated in FIG. 10, the constant-current power supply provided in the carriage No. zzzz positioned at the opposite end of the train is turned on, instead of the constant-current power supply provided in the carriage No. uuuu. This state is the same as the normal state illustrated in FIG. 5. Thus, it is possible to recognize the train configuration according to the procedure in normal situations as described above. It should be noted that, even if a failure has occurred in the constant-current power supply provided in one of the carriages other than the carriages positioned at the ends of the train, it is possible to perform the measuring operation in normal situations, as long as the constant-current power supply in the carriage positioned at an end of the train is working properly.

<An Operation that is Performed in the Case where a Failure has Occurred: a Failure in any of the Voltage Detectors>

Figure 11:
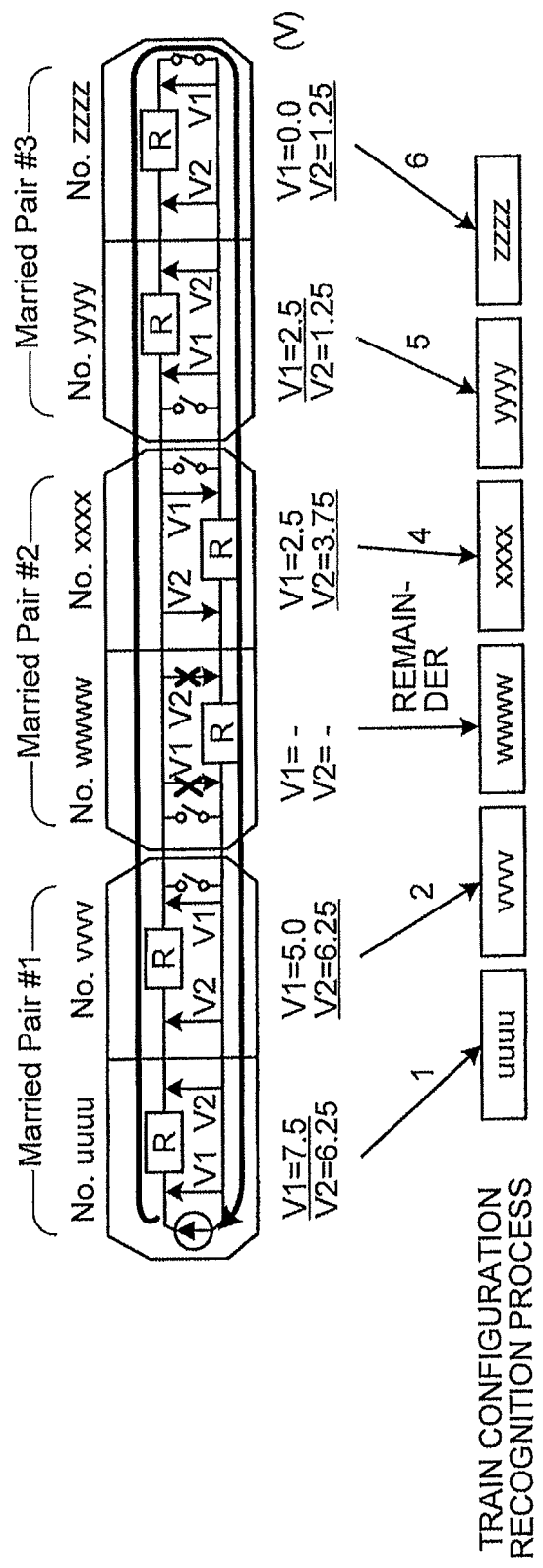
FIG. 11 is a diagram illustrating a state of a circuit in a situation where a failure has occurred in a voltage detector.

FIG. 11 is a diagram illustrating a state of a circuit in a situation where a failure has occurred in a voltage detector so that it is not possible to perform the measuring process in at least one of the carriages. In FIG. 11, a situation where a failure has occurred in the voltmeter provided in the carriage No. wwww, which is one of intermediate carriages, is illustrated as an example. In this situation, as for the carriage No. wwww in which the failure has occurred in the voltage detector, because there is no measurement information thereof, it is not possible to determine the position thereof based on the information thereof; however, when the positions of the other carriages have become clear, it is possible to determine the position of the carriage No. wwww by an elimination method. In other words, it is possible to determine the position of the carriage in which a failure has occurred in the voltage detector as the position that is remaining after the positions of all the other carriages have been determined.

<An Operation that is Performed in the Case where a Failure has Occurred: a Wiring Disconnection in any of the TCR Circuits>

Figure 12:
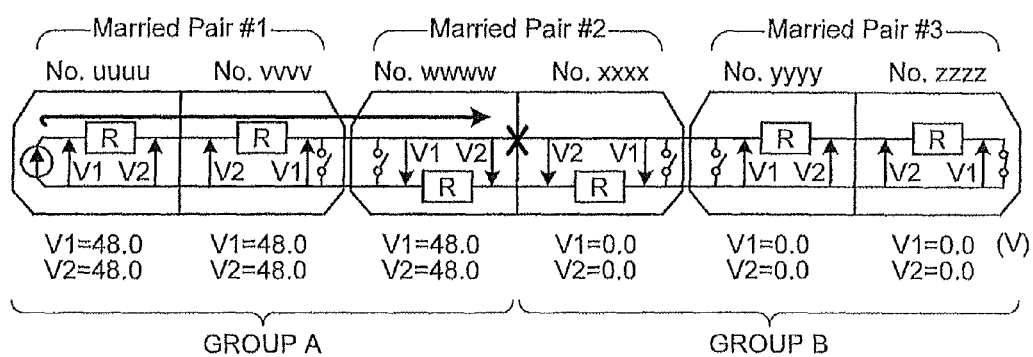
FIG. 12 is a diagram illustrating a state of a circuit in a situation where a wiring disconnection has occurred in a TCR circuit.

FIG. 12 is a diagram illustrating a state of a circuit in a situation where a wiring disconnection has occurred in a TCR circuit. In FIG. 12, a situation where a conduction failure has been caused by a wiring disconnection between the carriage No. wwww and the carriage No. xxxx in the married pair #2 is illustrated as an example. In this situation, the state is the same as the state in the example illustrated in FIG. 6 where a conduction failure has occurred in the automatic coupler. Accordingly, the first measured voltages V1 and the second measured voltages V2 may be organized into a group indicating 48 volts (i.e., Group A) and another group indicating 0 volts (i.e., Group B).

Figure 13:
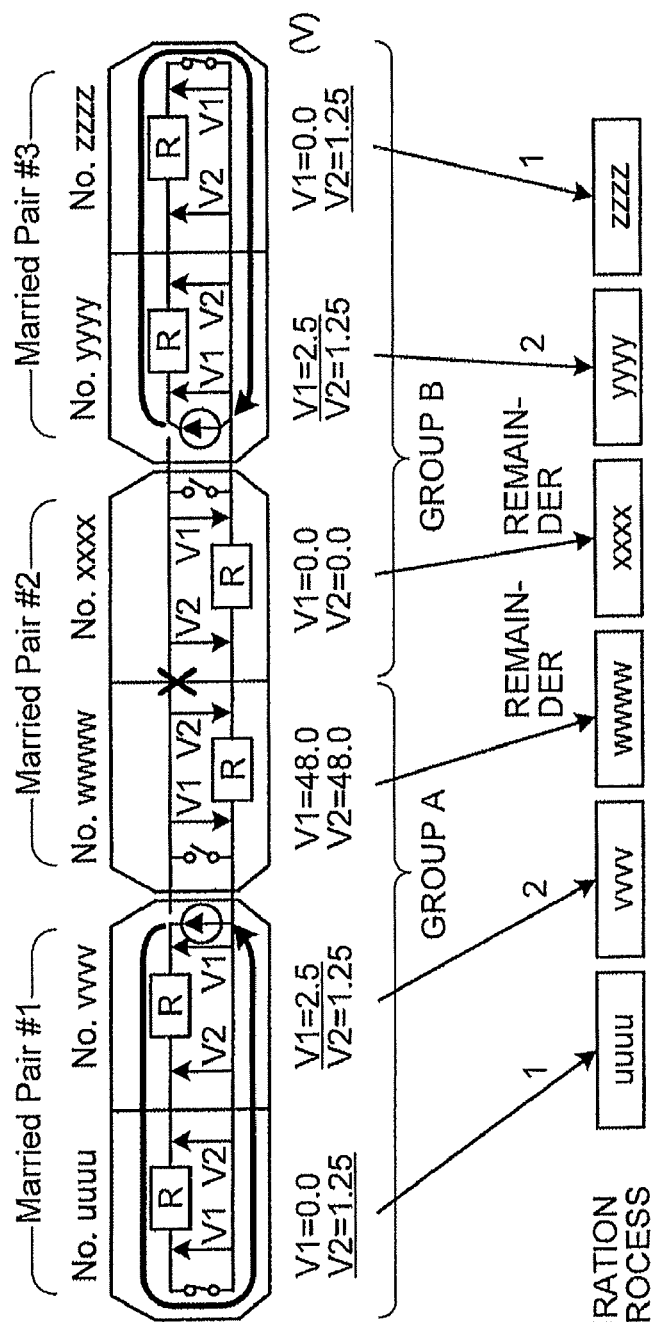
FIG. 13 is a diagram for explaining a measuring operation that is performed in the case where a wiring disconnection has occurred in a TCR circuit.

FIG. 13 is a diagram for explaining a measuring operation that is performed in the case where a wiring disconnection has occurred in a TCR circuit. In FIG. 13, in Group A, it is possible to recognize the configuration of the carriage No. uuuu and the carriage No. vvvv by turning on the constant-current power supply provided in the carriage No. wwww. Further, in Group B, it is possible to recognize the configuration of the carriage No. yyyy and the carriage No. zzzz by turning on the constant-current power supply in the carriage No. yyyy. In this situation, as for the carriage No. wwww and the carriage No. xxxx that are positioned on one of the sides of the wiring disconnection location respectively, it is not possible to determine the positions thereof based on the information thereof; however, like in the example in which a failure has occurred in a voltage detector, it is possible to determine the positions of these carriages based on the information regarding the positions of the other carriages.

As explained above, when the train configuration recognition system and the train configuration recognition apparatuses according to the present embodiment are used, it is possible to recognize the positions of the carriages (i.e., the physical position of each of the carriages indicating the position counted from the front end of the train such as the first carriage, the second carriage, or the like) even if there is no regularity in the carriage configuration of a train or in the numbers assigned to the carriages. In addition, it is possible to recognize the positions of the carriages that properly respond, without being affected by whether a failure has occurred in any of the apparatuses. In the case where a failure that has occurred in the apparatuses is a single failure, it is possible to speculate the positions of the carriages that do not properly respond, by using the information regarding the positions of the carriages that properly respond.

Further, when the train configuration recognition system and the train configuration recognition apparatuses according to the present embodiment are used, it is possible to provide the crew members of a train with train configuration information indicating, for example, which carriage is having a failure or an abnormality, with accuracy and with high reliability.

In addition, when the train configuration recognition system and the train configuration recognition apparatuses according to the present embodiment are used, there is no need to structure the entirety of the TCR circuits as a dual system. Thus, it is possible to achieve, without a large increase in the costs, the capability of responding to a major failure such as a conduction failure between automatic couplers, a conduction failure in a train end detection switch, a failure in a constant-current power supply, a failure in a voltage detector, or a wiring disconnection in a TCR circuit.

Furthermore, according to the present embodiment, the constant-current power supply is used as the power supply that causes the constant current to flow in the TCR circuits. Thus, it is possible to supply the constant current to the contact surfaces of the automatic couplers without being dependent on the number of carriages included in the train. Consequently, it is possible to keep the contact surfaces of the automatic couplers in a stable and excellent contact state. In addition, without being dependent on the number of carriages included in the train, it is possible to supply an electric current that is substantially constant in a stable and continuous manner.

In the description of the present embodiment, the power supply that causes the constant current to flow in the TCR circuits is configured with the constant-current power supply; however, it is acceptable to use other types of power supplies such as a constant voltage source, instead of the constant-current power supply.

INDUSTRIAL APPLICABILITY

As explained above, the communication apparatuses for railway carriages according to an aspect of the present invention is useful as an invention that makes it possible to automatically recognize the configuration of a train, without using regularities in train configurations and in the numbers assigned to the carriages.

The invention claimed is:

1. A train configuration recognition system for recognizing a configuration of a train configured with a plurality of carriages that are joined together while carriage groups each made up of a single carriage or two or more carriages are used as units, the train configuration recognition system comprising:

train end detection switches that are respectively provided at two ends of each of the carriage groups and each of which is configured so that a contact point thereof is open if another one of the carriage groups is joined to a corresponding one of the two ends and so that the contact point thereof is closed if none of other carriage groups is joined to the corresponding one of the two ends;

a pair of transmission lines that are provided in the train in such a manner that, at each of the two ends of each of the carriage groups, one end of a corresponding one of the train end detection switches is connected to one of the pair of transmission lines, whereas other end of the corresponding one of the train end detection switches is connected to other of the pair of transmission lines; and train configuration recognition apparatuses each of which is provided in a different one of the carriages and that recognize the configuration of the train, wherein one of the train configuration recognition apparatuses controls others of the train configuration recognition apparatuses within the train, and each of the train configuration recognition apparatuses includes:

a power supply that outputs a direct current;

first and second switches that are respectively inserted in the pair of transmission lines and that are configured so as to switch between (a) a state in which the power supply is inserted between the pair of transmission lines, and also, the pair of transmission lines are segmented and (b) another state in which the power supply is not inserted;

a resistor that is inserted in at least one of the pair of transmission lines;

a voltage detector that measures a voltage between the pair of transmission lines at each of both ends of the resistor; and a controlling unit to which the voltages having been measured by the voltage detector are input and that recognizes the configuration of the train and controls the first and the second switches in such a manner that there is only one location within the train where the power supply is inserted between the pair of transmission lines.

2. The train configuration recognition system according to claim 1, wherein the controlling unit exercises control so that the power supply is inserted between the pair of transmission lines in one of such carriages in which the train end detection switch is closed.

3. The train configuration recognition system according to claim 1, wherein in a case where an abnormality has been detected in any of measured voltage values that have been measured by the voltage detectors provided in the carriages, the controlling unit repeatedly changes a location in which the power supply is inserted and recognizes the configuration of the train based on the voltages that have been measured by the voltage detectors with the repeatedly-changed insertion locations.

4. The train configuration recognition system according to claim 1, wherein the power supply is a constant-current power supply.

5. The train configuration recognition system according to claim 1, wherein the pair of transmission lines are connected via automatic couplers that realize the joining between the carriage groups.

6. The train configuration recognition system according to claim 1, wherein the train end detection switches are mechanical switches that operate in conjunction with the automatic couplers.

7. The train configuration recognition system according to claim 1, wherein in a case where measured voltage values in all the carriages of the train are zero, such a power supply is turned on that is contained in a carriage group positioned on an opposite end from the carriage group in which the power supply has so far been turned on and that is provided in a carriage positioned on a side where no carriage from other carriage groups is joined to an end thereof.

8. The train configuration recognition system according to claim 3, wherein the controlling unit identifies a location in which a failure has occurred by comparing the measured voltage values that have been measured by the voltage detectors provided in the carriages, and based on a result of the comparing of the measured voltage values and information regarding the location that has been identified as where the failure has occurred, the controlling unit identifies a cause of the failure, which is one of following:

a conduction failure in any of the automatic couplers; a conduction failure in any of the train end detection switches;

a failure in any of the power supplies;

a failure in any of the voltage detectors;

a wiring disconnection in any of the transmission lines.

9. A train configuration recognition apparatus that is provided in each of a plurality of carriages and is included in a train configuration recognition system for recognizing a configuration of a train configured with the plurality of carriages that are joined together while carriage groups each made up of a single carriage or two or more carriages are used as units, the train configuration recognition system including, at two ends of each of the carriage groups, train end detection switches each of which is configured so that a contact point thereof is open if another one of the carriage groups is joined to a corresponding one of the two ends and so that the contact point thereof is closed if none of other carriage groups is joined to the corresponding one of the two ends, and the train configuration recognition apparatus comprising:

a power supply that outputs a direct current;

first and second switches that are respectively inserted in a pair of transmission lines and that are configured so as to switch between (a) a state in which the power supply is inserted between the pair of transmission lines, and also, the pair of transmission lines are segmented and (b) another state in which the power supply is not inserted, the pair of transmission lines being provided in the train in such a manner that, at each of the two ends of each of the carriage groups, one end of a corresponding one of the train end detection switches is connected to one of the pair of transmission lines, whereas other end of the corresponding one of the train end detection switches is connected to other of the pair of transmission lines;

a resistor that is inserted in at least one of the pair of transmission lines;

a voltage detector that measures a voltage between the pair of transmission lines at each of both ends of the resistor; and a controlling unit to which the voltages having been measured by the voltage detector are input and that recognizes the configuration of the train and controls the first and the second switches in such a manner that there is only one location within the train where the power supply is inserted between the pair of transmission lines, wherein one of train configuration recognition apparatuses controls others of the train configuration recognition apparatuses within the train.

10. The train configuration recognition apparatus according to claim 9, wherein the controlling unit exercises control so that the power supply is inserted between the pair of transmission lines in one of such carriages in which the train end detection switch is closed.

11. The train configuration recognition apparatus according to claim 9, wherein in a case where an abnormality has been detected in any of measured voltage values that have been measured by the voltage detectors provided in the carriages, the controlling unit repeatedly changes a location in which the power supply is inserted and recognizes the configuration of the train based on the voltages that have been measured by the voltage detectors with the repeatedly-changed insertion locations.

12. The train configuration recognition apparatus according to claim 9, wherein the power supply is a constant-current power supply.

13. The train configuration recognition apparatus according to claim 9, wherein the pair of transmission lines are connected via automatic couplers that realize the joining between the carriage groups.

14. The train configuration recognition apparatus according to claim 9, wherein the train end detection switches are mechanical switches that operate in conjunction with the automatic couplers.

15. The train configuration recognition apparatus according to claim 9, wherein in a case where measured voltage values in all the carriages of the train are zero, such a power supply is turned on that is contained in a carriage group positioned on an opposite end from the carriage group in which the power supply has so far been turned on and that is provided in a carriage positioned on a side where no carriage from other carriage groups is joined to an end thereof.

16. The train configuration recognition apparatus according to claim 11, wherein the controlling unit identifies a location in which a failure has occurred by comparing the measured voltage values that have been measured by the voltage detectors provided in the carriages, and based on a result of the comparing of the measured voltage values and information regarding the location that has been identified as where the failure has occurred, the controlling unit identifies a cause of the failure, which is one of following:

a conduction failure in any of the automatic couplers; a conduction failure in any of the train end detection switches;

a failure in any of the power supplies;

a failure in any of the voltage detectors;

a wiring disconnection in any of the transmission lines.

* * * * *